United States Patent [19]

Oprandi et al.

[11] 4,358,787

[45] Nov. 9, 1982

[54] DIGITAL PROCESS FOR CONTROLLING THE CORRECT REPRODUCTION OF A COMPOSITE TELEVISION SIGNAL AND A DEVICE FOR IMPLEMENTING SAID PROCESS

[75] Inventors: Pierre Oprandi; René Romeas, both of Paris, France

[73] Assignee: Thomson-Brandt, Paris, France

[21] Appl. No.: 153,854

[22] Filed: May 28, 1980

[30] Foreign Application Priority Data

May 31, 1979 [FR] France ................................ 79 13980

[51] Int. Cl.³ .......................... H04N 9/40; H04N 5/76
[52] U.S. Cl. ....................................... 358/14; 358/147
[58] Field of Search .................. 358/127, 128.5, 128.6, 358/4, 14, 147; 328/37, 55; 307/221 R

[56] References Cited

U.S. PATENT DOCUMENTS

| | | | |
|---|---|---|---|
| 3,162,838 | 12/1964 | Sauvanet | 358/14 X |
| 3,493,674 | 2/1970 | Houghton | 358/147 |
| 3,614,632 | 10/1971 | Leibowitz | 328/37 X |
| 3,667,054 | 5/1972 | Nelson | 307/221 R X |
| 3,716,656 | 2/1973 | Lambert et al. | 358/14 X |
| 3,871,019 | 3/1975 | Bingham | 358/4 |
| 3,900,887 | 8/1975 | Soga et al. | 358/127 X |
| 3,977,021 | 8/1976 | Kobayashi et al. | 358/128.6 X |
| 4,142,209 | 2/1979 | Hedlund et al. | 358/128.5 |

OTHER PUBLICATIONS

Radio Shack ® Dictionary of Electronics - ©1972, Fourth Edition, Second Printing 1974, pp. 97–98.

*Primary Examiner*—Stuart N. Hecker
*Attorney, Agent, or Firm*—Oblon, Fisher, Spivak, McClelland & Maier

[57] ABSTRACT

A digital process for controlling the correct reproduction of a composite television signal and in particular of a composite color television signal comprising sequential-type chrominance signals, transmitted or recorded on an information-carrying medium such as a videodisk in which binary-coded pulsed signals are inserted during available intervals of the line scanning return, the binary value of these pulsed signals representing a particular state to be controlled. This value is detected during the process reproducing the composite television signals to make the particular state to be controlled dependent on this value. A first coded pulsed signal may be used for identifying the two components of the chrominance signals. A second coded pulsed signal may be used for identifying the face read of a transparent videodisk having information recorded on both its faces.

9 Claims, 7 Drawing Figures

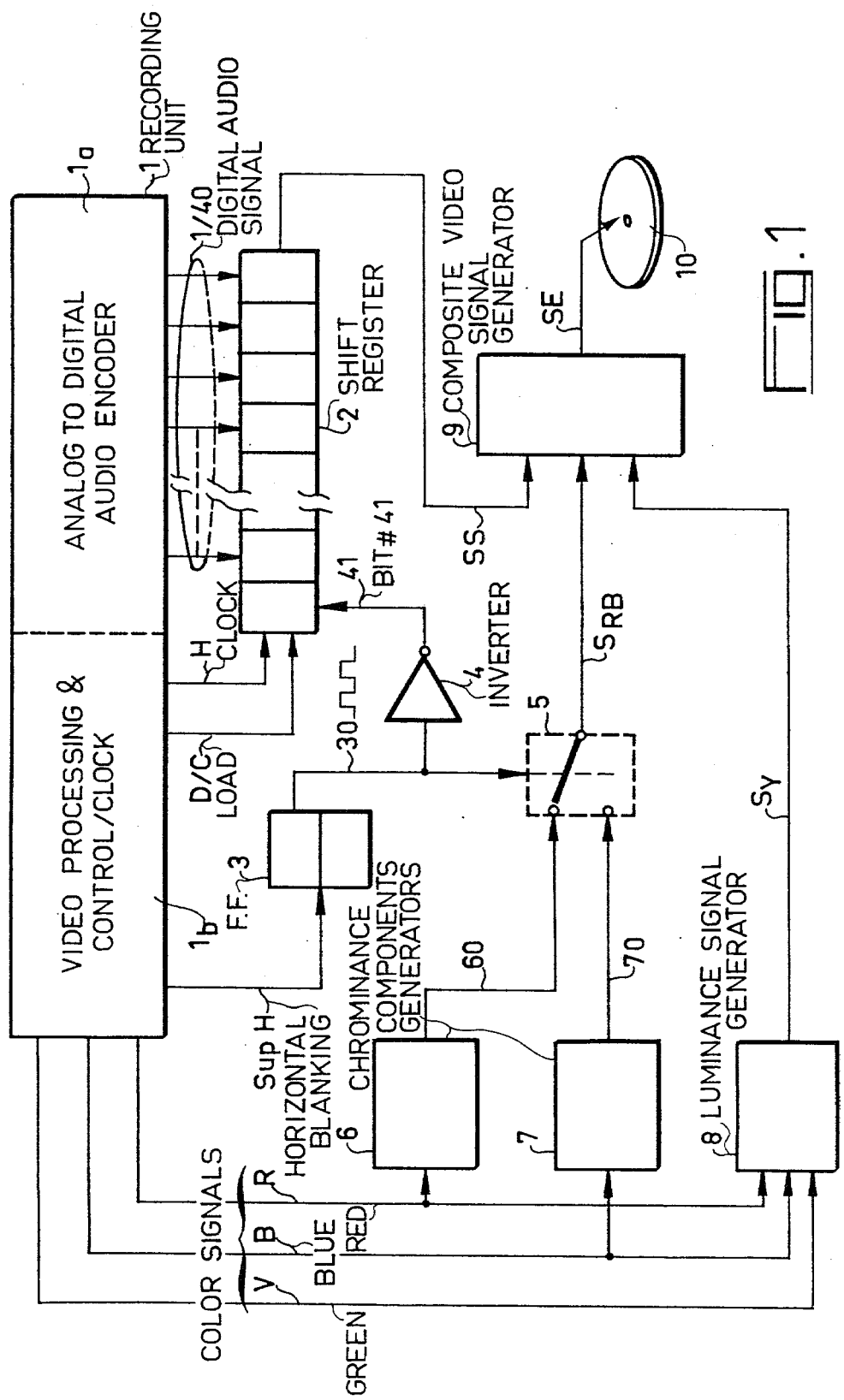

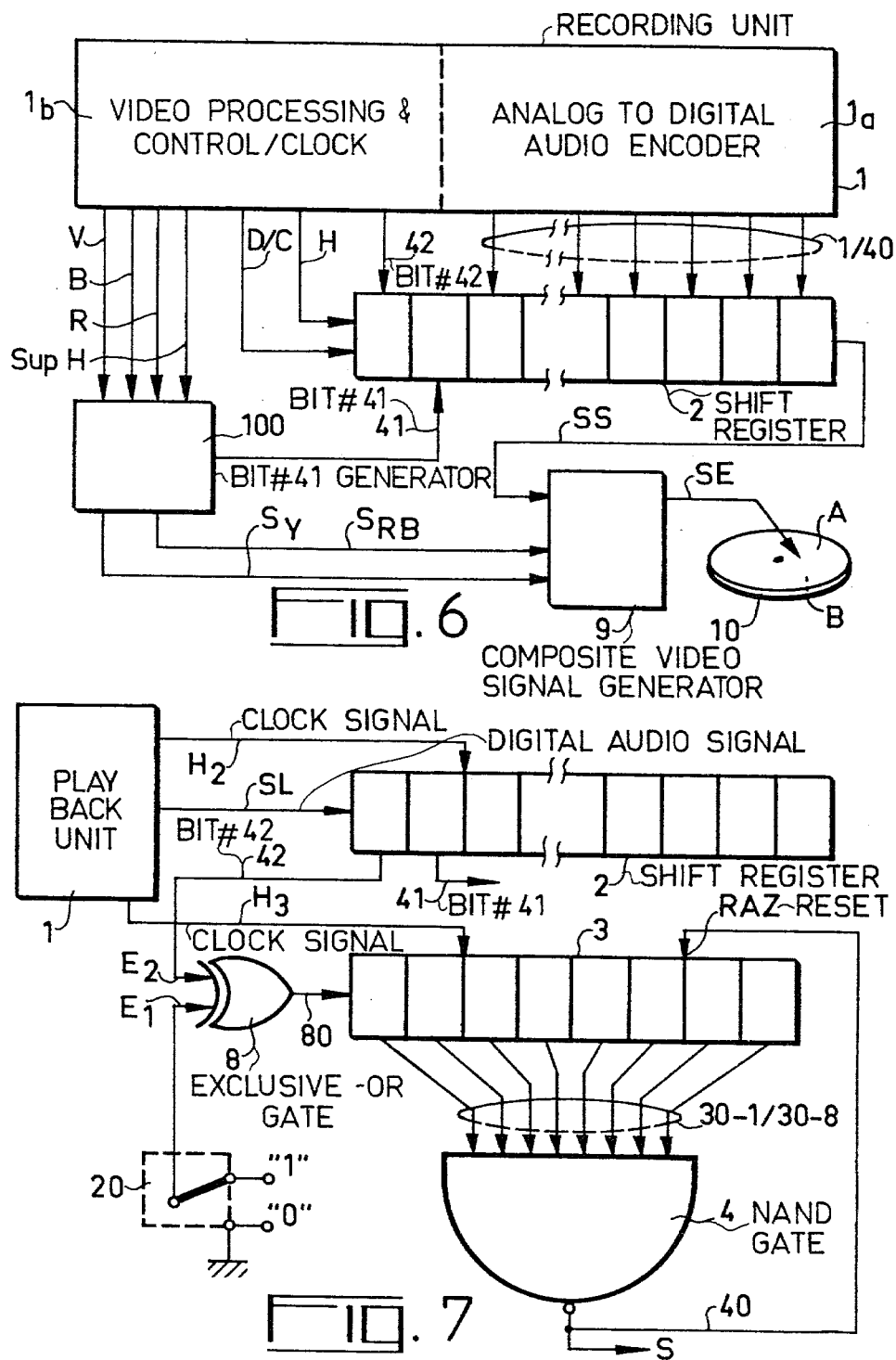

DIGITAL PROCESS FOR CONTROLLING THE CORRECT REPRODUCTION OF A COMPOSITE TELEVISION SIGNAL AND A DEVICE FOR IMPLEMENTING SAID PROCESS

BACKGROUND OF THE INVENTION

The invention relates to a digital process for controlling the correct reproduction of a composite television signal recorded on an information-carrying medium and to a device using this process.

The invention applies more particularly to a transparent videodisk optical reader carrying information recorded on both its faces.

The present standards for a color television system of the SECAM type (line by line alternate chrominance system) define specific signals intended to identify the analysis lines of the image carrying a first so-called D'R chrominance signal and the one carrying a second so-called D'B chrominance signal. These signals are situated in a time interval of nine consecutive lines, included in the time for the frame scanning return. These are lines 7 to 15 of the first frame and lines 320 to 328 of the second frame. These identification signals are composed of chrominance subcarrier salvos of a duration equal to that of the line, except for the line suppression time.

This identification system, though it is perfectly suitable for public transmission in the SECAM system, is however not optimized for certain applications, and in particular in the case of a videodisk recording.

It is also customary, in the known art, to multiplex standardized synchronization pulsed signals with the video luminance signal. This multiplexing usually takes place on the amplitude during the frame and line return times. This method presents several disadvantages: on the one hand, all the available amplitude for modulating the video signal cannot be used, on the other hand, the synchronization taking place on the edge of these signals, any deterioration of these signals or any superimposition of parasite signals may cause synchronization faults.

Different processes and devices have been proposed:

(1) for freeing to a large extent the line and frame return intervals;

(2) for transcoding in a simple way television signals recorded according to a sequential type television system with any desired system, for example NTSC or PAL;

(3) for using the freed intervals for recording sound signals accompanying the television images in digital form.

SUMMARY OF THE INVENTION

Using the particular coding used on a videodisk produced according to the above-mentioned processes, the invention proposes a digital control process for correctly identifying chrominance signals while ensuring a very good protection against impairment which may occur during reproduction of the videodisks. For this, in addition to the digital signals representing the sound channels, a coded pulse is inserted during the line return interval, identifying the two sequential components of the chrominance signals by its logical value "0" or "1".

The invention is not limited to the control of this function, by inserting other coded pulses, other functions may be controlled, and particularly the permanent control of the read face of a transparent disk carrying information recorded on both its faces.

The invention provides then a digital process for controlling the correct reproduction of a composite television signal transmitted, or recorded on an information-carrying medium, at the timing of the scanning of the lines of an image; this process consisting in inserting during the recording or transmitting process of said composite signal, at a predetermined time during the return intervals of said line scanning, at least one binary-coded pulsed signal in which the succession of the logic values taken by said signal represent a pre-established sequence of binary states to be controlled; and in detecting said succession of values during the reproduction process of the composite television signals in order to make said pre-established sequence of binary states to be controlled dependent on said succession; the dependence being made insensitive to consecutive alterations of said pre-established sequence less in number than a predetermined threshold.

The invention also provides a device for making the state to be controlled dependent on the logic value of binary-coded pulses in accordance with this process.

DESCRIPTION OF THE DRAWINGS

The invention will be better understood and other features will appear from the following description, made with reference to the accompanying figures:

FIG. 1 is a digital coding device for inserting a coded pulse during the line scan return interval identifying the chrominance signals.

FIGS. 6 and 7 illustrate a second embodiment of the invention.

DESCRIPTION OF THE PREFERRED EMBODIMENTS

Figure 5:
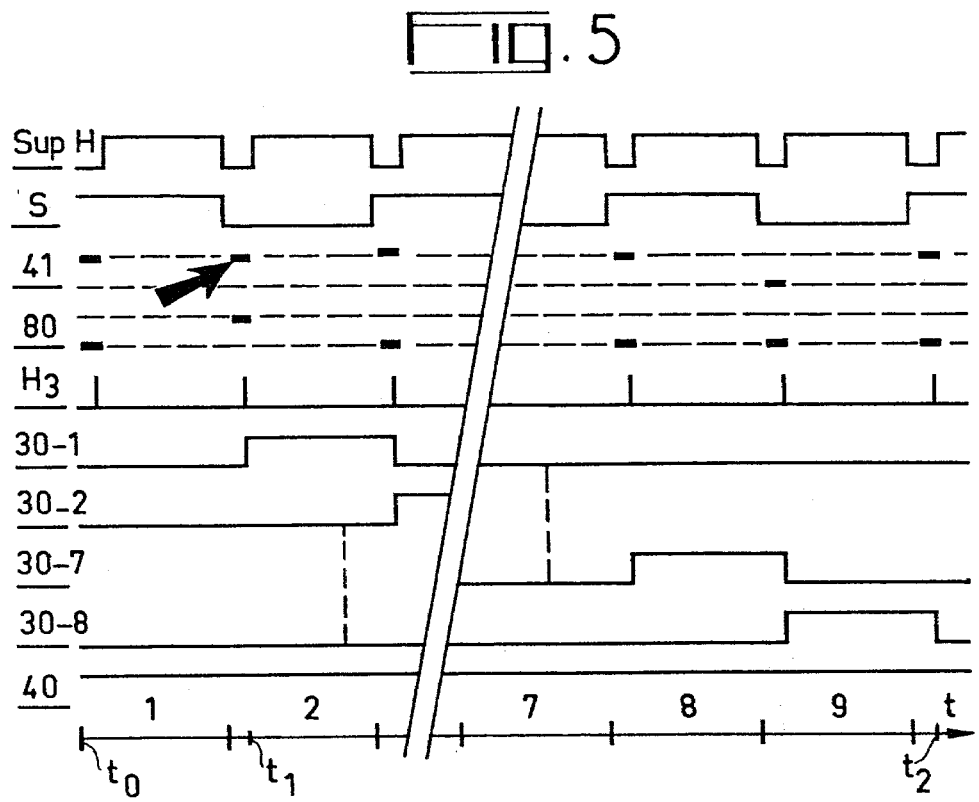
FIGS. 4 and 5 are diagrams for explaining the process of the invention.

According to an advantageous process the sound signals may be digitally coded after analog-digital conversion and the bits representing these signals are inserted in the line scan return intervals. These bits are for example 40 in number and do not wholly occupy this interval, it is then possible to fit therein several more bits.

According to the invention, at least one additional pulse in the form of a binary-coded bit taking the logic values "1" or "0", will be inserted in the interval left available, during the recording process. Each of the pulses represents a state to be monitored. These pulses will be used during the reading process to ensure the correct reproduction of the composite television signals recorded on the vidoedisk.

According to a first aspect of the invention, a first coded pulse will allow the chrominance signals to be identified. This coded pulse, in the form of an additional bit, for example bit 41 (placed after the 40 bits coding the sound), takes on the logic values "1" or "0" according as to whether it is placed at the beginning of a line carrying the chrominance signal usually called $D'_R$ or the signal called $D'_B$. The values "1" or "0" may be assigned equally well to the signals $D'_R$ or $D'_B$. Conventionally, in the rest of the description, level "0" will correspond to lines $D'_B$ and level "1" lines $D'_R$.

FIG. 1 shows a coding device for implementing the process of the invention. Reference number 1 represents the usual circuits of a videodisk recording unit and in particular the circuits for coding the sound channel $1_a$ and the video, clock and synchronization circuits $1_b$. These circuits will not be described for they are outside the scope of the invention and are well-known to a man skilled in the art. These circuits supply for example 40 bits representing the sound channel, references 1/40. The video circuits $1_b$ supply the basic signals: red (R), green (V) and blue (B), coming from an image analyzer (camera, telecinema, etc . . . ) not shown.

These signals are transmitted to the input of known devices 5, 6, 7 and 8, elaborating signals $D'_R$, $D'_B$ and Y (luminance). On leaving these devices, signals $D'_R$ and $D'_B$ are simultaneously present in all the scanning lines. These signals are directed towards the inputs of an electronic switch 5, via connections 60 and 70. This switch is controlled by a signal present at the output of a flip-flop 3, through connection 30. Flip-flop 3 receives on its clock input a signal, Sup H, in synchronism with the line suppression signals. From one scanning line to the next, the electronic switch 5 alternately transmits the signals present at the output of devices 6 and 7. The electronic switch 5 is constructed so that it lets pass through to output $S_{RB}$ the signal $D'_R$ when connection 30 is brought to logic level "1" and signal $D'_B$ when connection 30 is brought to logic level "0".

The signal present at the true output of flip-flop 3 is also transmitted to the input 41 of a shift register with parallel inputs and series outputs 2. The inputs 1 to 40 receive the bits coming from the sound coder $1_a$. The signal supplied by flip-flop 3 is previously inverted by the inverter circuit 4. In fact, bit 41 at the beginning of a line in position n must be loaded into the register before the beginning of this line by the register-loading pulse D/C. Since this loading takes place on the line position $n-1$, it is advisable to invert the logic signal of flip-flop 3 so that it assumes at the input of register 2, on the line in position $n-1$, the logic level which it will have on the line in position n, at the control input of switch 5. During the line suppression interval, the bits recorded in register 2 are shifted towards the series output SS by clock pulses H. The sound bits, followed by the chrominance identification bit, are then directed to the modulation circuits 9. These circuits 9 also receive the signals $S_{RB}$ and $S_Y$. This latter signal is the luminance signal obtained by matrixing the three primary colors V, B, R. This matrixing is elaborated by device 8 well-known to the man skilled in the art. The same goes for devices 6 and 7 and 9, which will not be described. The output signals SE from circuit 9 comprise the composite color television signals, service signals, digital signals for the sound channels as well as the coded pulses in accordance with the process of the invention. These different signals are recorded on a videodisk 10, by any appropriate means.

Figure 2:
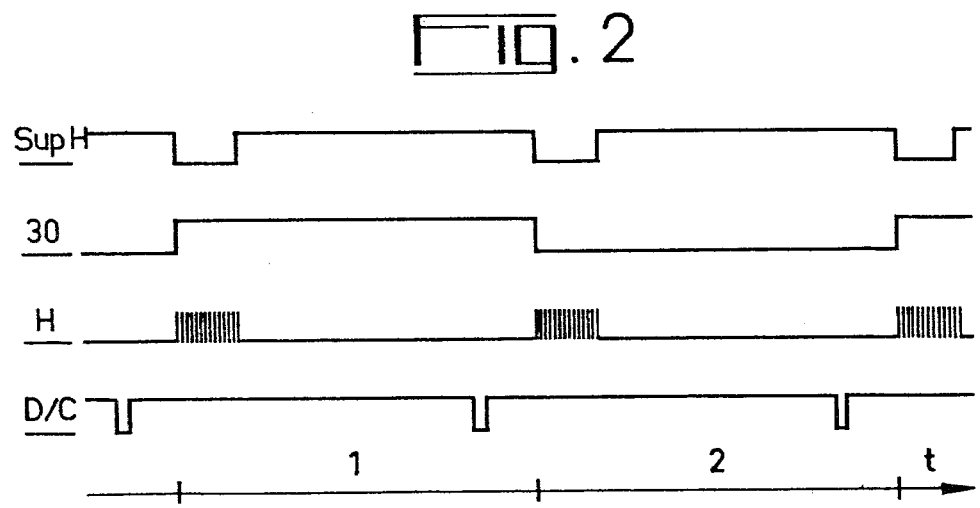
FIG. 2 is a diagram illustrating the timing of the principal operations.

FIG. 2 shows the timing of the principal signals of the device of FIG. 1. On the first line, the "Sup H" signals represent the line suppression signals, the second line "30" represents the signals present at the output of flip-flop 3, controlling switch 5. Line "H" represents the clock pulse salvos and the line "D/C" represents the loading pulses transmitted to the corresponding input of shift register 2. On the time axis, are shown two consecutive scanning lines 1 and 2.

For decoding it is necessary to recognize, by using bit 41 placed for this purpose at the end of the binary train coding the sound, the scanning lines carrying the chrominance signal $D'_R$ and those carrying the signal $D'_B$. For this, it is sufficient to reconstitute in synchronism with the 41st bit the signal of flip-flop 3 of the coder (level "1" signal on scanning line $D'_R$ and "0" on line $D'_B$). This signal assumes then level "1" on the lines carrying at their beginning bit 41 at level "1" and level "0" on the lines carrying at their beginning bit 41 at level "0". It would be sufficient in a simplified system to recopy, at the beginning of the line, the level of the 41st bit serving to control the chrominance function and to keep it until the next line in order to obtain signal S. It happens however that for different reasons bit 41 is either unreadable or erroneous (loss of signal, poor reading, etc . . . ), which introduces a brief but nevertheless troublesome inversion of the chrominance identification signal S. There then occurs, during one or more scanning lines, from time to time, an identification error of the chrominance signal causing incorrect reproduction of the colors.

To palliate this disadvantage, the invention proposes arrangements providing efficient protection against reading errors or other momentary losses of the signal. This forms another aspect of the invention.

The device for reading the coded control pulses in accordance with the process of the invention as well as the arrangements made for protecting these pulses will be described with reference to FIGS. 3 to 5.

Figure 3:
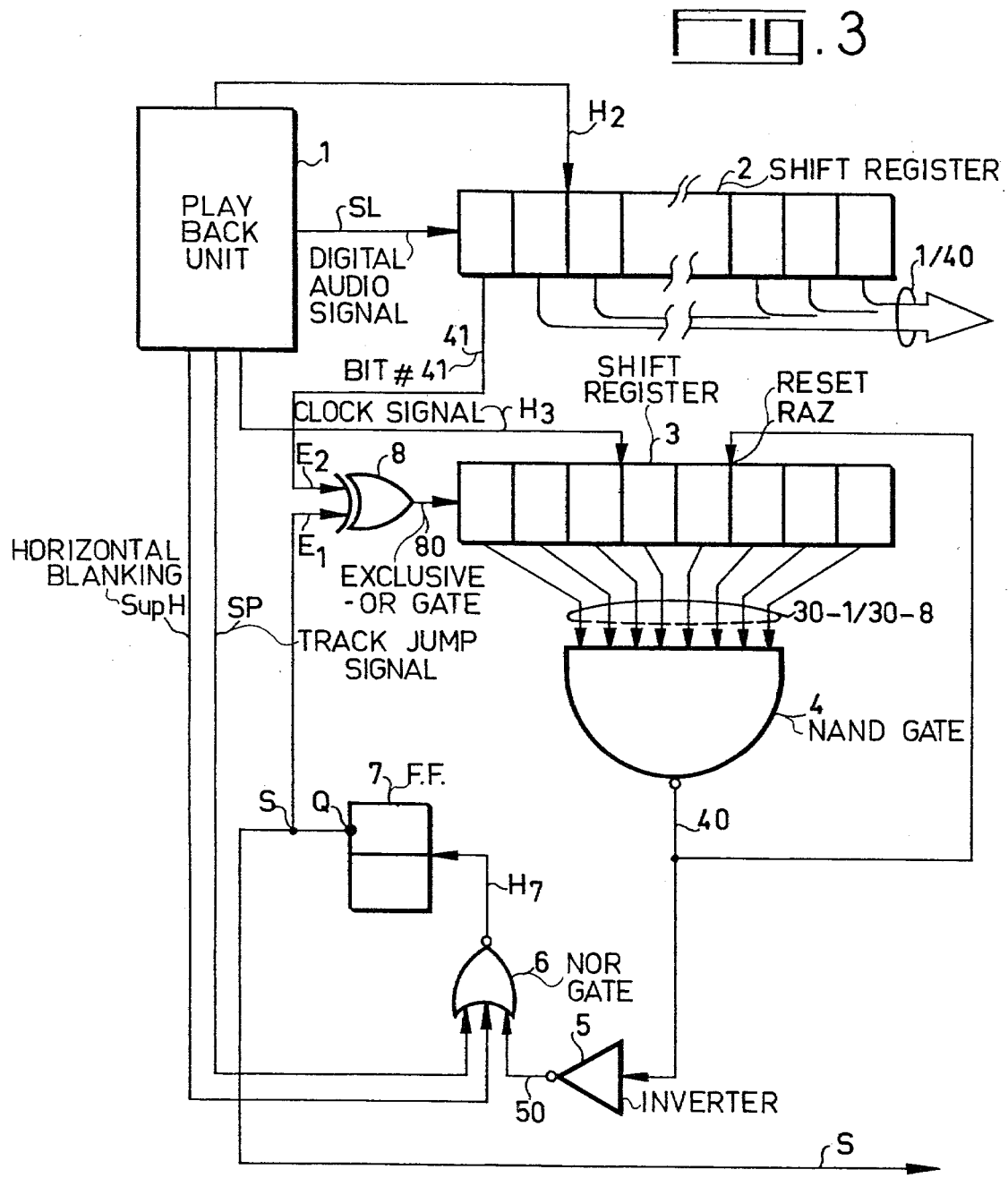
FIG. 3 is a device for reading the coded pulses in accordance with the process of the invention.
Figure 4:
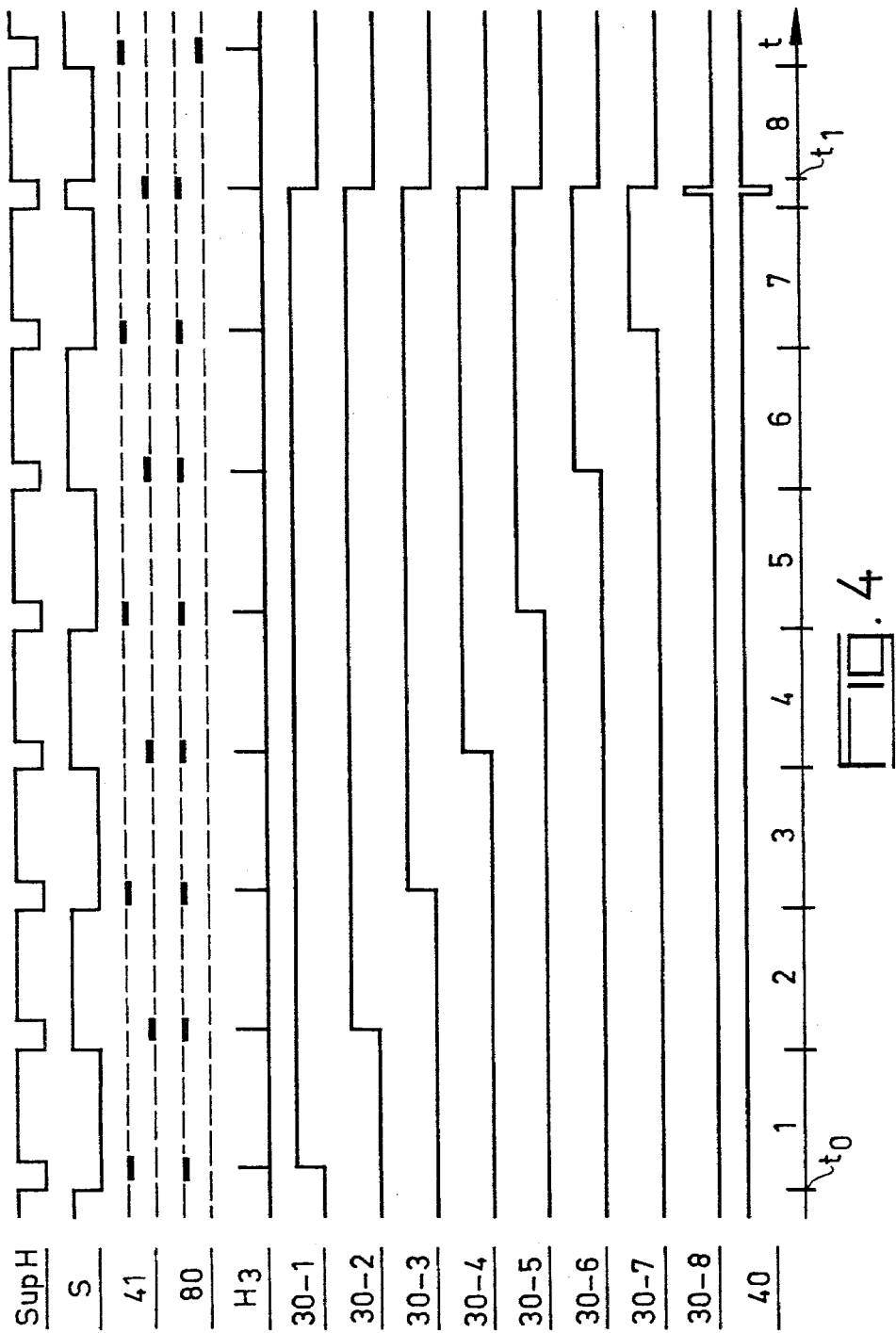

FIG. 3 shows the reading device of the invention. Under the reference number 1 are shown the usual circuits of a videodisk reader. These circuits known to the man skilled in the art will not be described in detail, they provide in particular at the output SL the digital signals of the sound channel as well as the coded control pulses in accordance with the invention, read on the videodisk. These circuits also supply clock and synchronization signals: Sup H, $H_2$, $H_3$ and SP, elaborated in synchronism with the reading of the information recorded on the videodisk. The digital series signals SL are transmitted to a shift register 2, having a series input and parallel outputs and are shifted at the timing of clock signal $H_2$ a sub-multiple of the line frequency. Bits 1 to 40 are sound bits transmitted to a decoding device not shown. Bit 41 representing the coded pulse in accordance with the invention is transmitted to a second shift register with series input and parallel outputs 3, via a logic "EXCLUSIVE-OR" gate 8 and connection 80 connected to the input of this register. Bit 41 is available at the output 41 of shift register 2 at the time corresponding to synchronization pulse $H_3$ elaborated from the clock signal $H_2$. The corresponding signals are illustrated on the timing chart of FIG. 4. It enables the inputting, at each scanning line, of bit 41 into shift register 3. The logic "EXCLUSIVE-OR" gate 8 plays the role of an inverter controlled by signal S from the true output Q of a flip-flop 7. This signal may be used as a chrominance identification signal and serves then for controlling the correct alternation of the chrominance signals during the reading process. This alternation is made dependent on the logic value of bit 41. Flip-flop 7 changes its state at each line suppression pulse that it receives at its clock input $H_7$ through the "NOR" gate 6. This gate receives at one of its inputs a sampling signal, Sup H, at the timing of the line suppression signals. These signals are also illustrated in the timing charge of FIG. 4. The broken lines corresponding to signals 41 and 80 indicate the time intervals during which these signals are not significant, only the parts shown with a thick line are to be taken into account, i.e. corresponding essentially to the moments when brief clock pulses $H_3$ appear. The time axis t represents the succession of eight consecutive lines referenced 1 to 8.

It is assumed that at time $t_0$, signals serving as chrominance identification is in an inverse logic state to what it should be (state "0" on line $D'_R$; state "1" on line $D'_B$ instead of "1" on $D'_R$ and "0" on D'B). Input $E_1$ of loigc "EXCLUSIVE-OR" gate 8 will be at logic level "0" on the line carrying the signal $D'_R$. This gate lets then through without modification bit 41, present at its input $E_2$ and which is at logic level "1" on this line $D'_R$.

At the next scanning, input $E_1$ of gate 8 is brought to logic level "1" and lets through, while inverting it, bit 41 present at its input $E_2$ and which is at level "0" on scanning line $D'_B$. The signal present at the output 80 of gate 8 will be brought to logic level "1" for all the scanning lines. These bits at level "1" are applied to the input of shift register 2 and loaded into the register by the clock pulses $H_3$. The output 30-1 to 30-8 of the register assume in turn the value "1" and at the eight clock pulse $H_3$, all the outputs are brought to logic level "1". These outputs are transmitted to the corresponding inputs of a logic gate 4. When all the inputs of this gate 4 are brought to logic level "1", the output 40 assumes the logic level "0". This output is connected to the resetting input RAZ of shift register 3. The switching from state "1" to state "0" of the output 40 of gate 4 resets at the same time all the outputs 30-1 to 30-8 of this register, which cuases output 40 of gate 4 to return to logic level "1". The connection 40 transmits then, via an inverter 5 and connection 50, a brief positive pulse to one of the inputs of the logic "NOR" gate 6. This pulse is transmitted to flip-flop 7 causing the output Q of this flip-flop, so signal S, to change state.

After this change of state, flip-flop 7 continues to operate at the timing of the line suppression pulses but presenting this time an output state assuming logic level "1" on scanning lines, $D'_R$ and "0" on scanning lines $D'_B$, which corresponds to a correct chrominance identification signal S.

Since this input $E_1$ of gate 8 is at logic level "0" on scanning lines $D'_B$, it lets through without modification bit 41 which is at level "0" on these lines. On the other hand, with this same input $E_1$ at level "1" on lines $D'_R$, it lets through, while inverting it, bit 41 which is at level "1" on these lines. The bits transmitted to shift register 3 all have then logic level "0". Consequently, outputs 30-1 to 30-8 remain permanently at "0" as well as the inputs of gate 4, the output of this gate 4 not delivering pulses as long as the phase of the signal identifying the chrominance S remains correct.

If now an error affects one or more chrominance identification bits, this causes the input of shift register to go to level "1" and this bit to be stored. This bit is then shifted in the register at the timing of line pulses $H_3$. However, eight errors must occur on eight consecutive scanning lines for all the outputs of register 3 to be brought to logic level "1" and for a pulse to thus appear at output 40 of gate 4 causing flip-flop 7 to change state. This eventuality is not very probable.

FIG. 5 illustrates the case which has just been described on an isolated alteration. During time $t_0$ the chrominance identification signals S have a correct phase. At time $t_1$, bit 41 shown in the figure by an arrow is erroneous. It follows that a level "1" bit is loaded into the shift register (on line "30-1" of FIG. 4). At the next scanning line, with bit 41 again correct, a level "0" bit will be inputted into shift register 3. The error will be materialized by a pulse propagated from stage to stage in register 3 (lines "30-3" to "30-8" in the figure). After scanning line 9, i.e. after time $t_2$, this pulse will disappear. The successive outputs 30-1 to 30-8 and the corresponding inputs of gate 4 will be successively at a logic level "1". However it would have required the eight inputs of gate 4 to be at this same level to produce the change-of-state pulse on the clock input flip-flop 7.

The arrangements considered provide then a very good protection against the alterations met with during the copying process. This protection may furthermore be increased or diminished simply by changing the number of stages of shift register 3, as well as the number of corresponding inputs of "NAND" gate 4.

In the particular cases of stopping on the image or artifices such as slow or accelerated motion, the reading head of the videodisk included in the circuits referenced 1 in FIG. 3, effects a controlled skip during reading from one track to the immediately adjacent track (rearward skip of one track at each rotation to obtain stopping on the image). Because the recording comprises exactly one complete television image for each rotation of the disk and therefore an uneven number of lines (for example 625, 525), the chrominance sequence is inverted at each skip, so the pulse coded in accordance with the process of the invention and read by the reading head will be incorrect. It would be necessary on this assumption to wait at the minimum for eight lines after the skip (time for filling register 3) to find again a correct phase of signal S. This disadvanatage may be avoided by feeding onto the 3rd input of the "NOR" gate 6 a brief pulse SP at each track skip control, this pulse, causing flip-flop 7 to change state, immediately puts signal S back in phase.

This signal S having a correct phase by means of the device which has just been described may be used to synchronize SECAM, PAL or NTSC modulators intended to accord the signal supplied by the videodisk reader to the norms of the desired color television standard. This aspect has been described particularly in U.S. Pat. No. 4,095,254.

The signals coded in accordance with the invention may be used for controlling other functions than that of the alternation of the chrominance. In particular, on a transparent videodisk carrying information recorded on both its faces (A and B), the use of an additional coded pulse, for example a 42nd bit, allows the read face to be permanently controlled. FIGS. 6 and 7 illustrate this possibility.

FIG. 6 corresponds to the coder of FIG. 1. Circuit 1b supplies a 42nd bit identifying the face of the videodisk 10 on which will be written the composite television signals, the service signals, the signals for the sound channels and the pulses coded in accordance with the invention. This bit will be transmitted to a 42nd shift register 2. The circuits bearing the general reference 100 as well as the circuits for generating signals $S_{RB}$ and $S_Y$ are circuits for coding the 41st bit illustrated in FIG. 1. Bit 42 loaded at the same time as sound bits 1 to 40 and the 41st bit forming the coded pulse identifying the chrominance signals will be loaded into register 2 by means of clock pulses H. These bits are then shifted and transmitted to the series output SS.

During the reading process, bit 42 will be transmitted in the same way as bit 41 to a shift register 3 (FIG. 7). This transmission also takes place through a logic "EXCLUSIVE-OR" gate 8 and the connection 80. The outputs 30-1 to 30-8 of this shift register 3 are transmitted in their turn to the inputs of a "NAND" gate 4 whose output 40 is connected to the resetting input RAZ of the register. The second input of gate 8 is connected to a device 20 for choosing the face read. This device is shown symbolically in FIG. 7 by a two-way switch. This switch enables a logic level "1" or "0" to be transmitted to the second input of logic gate 8. Conventionally, the logic value "1" represents the face A of the videodisk and logic value "0" face B. The operation of the device shown in FIG. 7 is similar to the operation of the device shown in FIG. 3. The reading head included in the circuits referenced 1 restores bit 42 during the scanning line return interval (and this for each scanning line). In the case of an optical-read videodisk having recordings on both faces of the disk, reading may be carried out by focussing a luminous spot at the level of one or the other of these faces. This focussing is controlled by a servo-circuit. This circuit departs from the scope of the invention and will not be described. In the case of incorrect operation, the focussing point may leave the surface of the desired reading face. Bit 42 read will henceforth be at logic value "0". It follows that at the end of eight consecutive scanning lines all the outputs 30-1 to 30-8 will pass to logic level "1". The output of logic NAND gate 4 will pass to level "0". This transition causes the resetting of all the stages of shift register 3. The signal present at the output of gate 4 again assumes the value "1". The device of FIG. 7 has then produced at its output S a pulse of short duration. This pulse may be used by the servo-circuit for refocusing the luminous reading spot at the level of the desired face.

When a reading error of bit 42 occurs or any other alteration during copying, the device operates in a similar way to that of FIG. 3, i.e. that it is necessary for this error to be reproduced for eight consecutive scanning lines to cause an operating fault.

This fault will moreover disappear at the end of eight more scanning lines, if bit 42 read is again correct.

If the operator desires to change the face read, all that is required is to change switch 20 from one position to the other, for example from logic position "1" to logic position "0". It follows that the bits present at the output 80 will assume the value "1" and be stored in shift register 3. After eight consecutive scanning lines, all the outputs 30-1 to 30-8 will be at logic value 1 and the process previously described will be renewed: a pulse of short duration will be transmitted by output S to the servo-circuit and cause a change of the face read. It goes without saying that switch 20, shown in FIG. 7 by a mechanical two-position switch, may be an electronic switch and be controlled by other electronic circuits not described, to achieve automatic operation.

Other coded pulses may also be inserted to control supplementary functions. By way of non-limiting example, a third pulse, i.e. in the example which has been described a bit No. 43, may used to detect the end of the face read and cause the reading means to return to the initial point or an automatic change of the face read. In another embodiment coded pulses may represent predetermined parts of a recording, instead of the two faces of a disk, these predetermined parts being either on the same face of the disk or on the contrary shared between the two faces.

For a concrete embodiment of the devices which have been described with reference to FIGS. 1, 3, 6 and 7, integrated circuits of the following types, available commercially, may be used by way of non-limiting examples:

| | |
|---|---|
| shift registers with series input and parallel outputs (FIGS. 3 and 7:2, 3) | circuits SN 74164N |
| shift circuits with parallel inputs and series output (FIGS. 1 and 6:2) | circuits SN 74165N |
| flip-flops (FIG. 1:3, FIG. 3:7) | circuits SN 7474N |
| inverters (FIG. 1:4, FIG. 3:5) | circuits SN 7404N |
| "NOR" gates (FIG. 3:6) | circuits SN 7427N |
| "EXCLUSIVE-OR" gates (FIGS. 3 and 7:8) | circuits SN 7486N |
| NAND gates (FIGS. 3 and 7:4) | circuits SN 7430N |

All these integrated circuits are commercialized by the firm TEXAS INSTRUMENTS; the switch circuits 5 (FIG. 1) and 10 (FIG. 7) may be AD 7512 circuits from the firm ANALOG DEVICE.

The invention is not limited to the devices which have just been described. The invention may be used in all systems for recording or transmitting television signals with sequential type chrominance, other than videodisk apparatus, without departing from the scope and spirit of the invention.

What is claimed is:

1. A digital process for checking the correct reproduction of a composite television signal transmitted or recorded on an information-carrying medium at the timing of the scanner of the lines of an image, comprising the steps of:
   inserting at least binary-coded pulse signals during the recording or transmission of said composite signal at a predetermined time during the return intervals of said line scanning wherein the succession of logical values assumed by said signal determines a pre-established sequence of binary states to be checked;
   detecting said succession of values during the reproduction of said composite signals;
   correlating said detecting values with said pre-established sequence of binary states to be checked so that said sequence is dependent upon said succession of values; and
   modifying said correlation so that the dependency of said sequence upon said succession of values is insensitive to consecutive alternations of said pre-established sequence less in number than a predetermined threshold number.

2. The process as claimed in claim 1 including the further step of assigning to a first coded pulsed signal which alternates from one of said lines to the next, the logical values "1" and "0" to represent respectively the red and blue components of a chrominance signal when said composite signal comprises a sequential-type chrominance signal.

3. The process as claimed in claim 2, further comprising the steps of:
   inverting said first coded pulsed signal representing one of the components of the chrominance signal transmitted or recorded during the scanning line of position n; and
   inserting said first coded pulsed signal at a predetermined time during the return interval of the scanning line of position space $n-1$.

4. The process as claimed in claim 1, wherein a second coded pulsed signal assumes the logical values "1" or "0", representing signals recording respectively on a first part and a second part of said information-carrying medium.

5. The process as claimed in claim 4, wherein said information-carrying medium is a rotary information-carrying medium with two faces each having information recorded thereon and in which said first and second parts are each one of said faces.

6. A device for checking the correct reproduction of a composite television signal transmitted or recorded on an information-carrying medium at the timing of the scanning of the lines of an image comprising:
   means for inserting at least one binary-coded pulsed signal at a predetermined time during the return intervals of said line scanning during the recording and transmitting process whereby said pulsed signals have a succession of logical values which represent a pre-established sequence of binary states to be checked;
   reading and storing means for storing said coded pulsed signals;
   first shift register means having a predetermined number of stages;
   logic circuit means for repeatedly introducing said coded pulsed signals recorded in said storage means into said first shift register means whereby the repeated introduction of said pulses is sequenced with said line scanning timing;
   detection circuit for receiving at its inputs the outputs of said first shift registers means and outputting a pulse for reinitializing said first shift register means when all of said outputs of said stages are at the same logic value.

7. The device as claimed in claim 6 wherein said first shift register means is formed by at least one eight-stage shift register comprising a reset input and wherein said logic circuit is formed by at least one logic "EXCLUSIVE-OR" gate with two inputs and further wherein said detection circuit is a logic "NAND" gate with eight inputs and whose output is connected to said reset input of said shift register.

8. The device as claimed in claim 7 wherein said logic circuit comprises a first logic "EXCLUSIVE-OR" gate and a flip-flop having a clock input whose output is connected to the input of said first logic "EXCLUSIVE-OR" gate and an inverter and a logic "NOR" gate for processing said clock input to said flip-flop whereby the signals present at the output of said logic "NAND" gate detects the logic state of the outputs of said first shift registers with said logic "NOR" gate also receiving a sampling signal in sequence with said line scanning timing.

9. The device as claimed in claim 8 further comprising a second shift register;
   a second logic "EXCLUSIVE-OR" gate for outputting a second binary-coded pulsed signal to said second shift register;
   a control device whose output it connected to said second logic "EXCLUSIVE-OR" gate with said control device supplying a binary signal of a previously established logic value "1" or "0" so that said binary-coded pulsed signal stored in said storage means are introduced to said second shift register in sequence with said line scanning timing.

* * * * *